Dec. 4, 1934.  J. J. N. VAN HAMERSVELD  1,983,200
CONTROL FOR MACHINE TOOLS
Filed Feb. 9, 1931  3 Sheets-Sheet 1
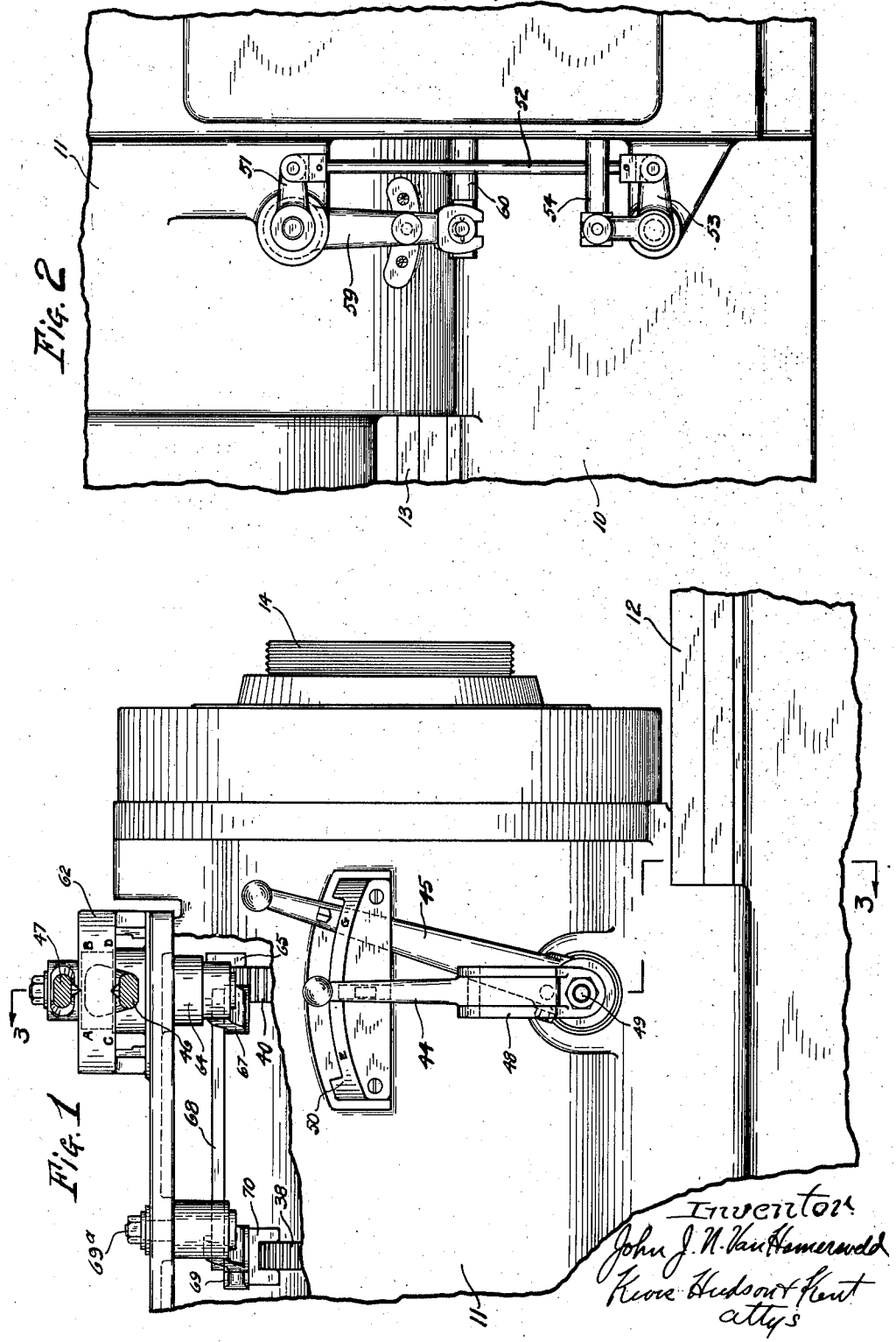

Dec. 4, 1934.  J. J. N. VAN HAMERSVELD  1,983,200
CONTROL FOR MACHINE TOOLS
Filed Feb. 9, 1931   3 Sheets-Sheet 2
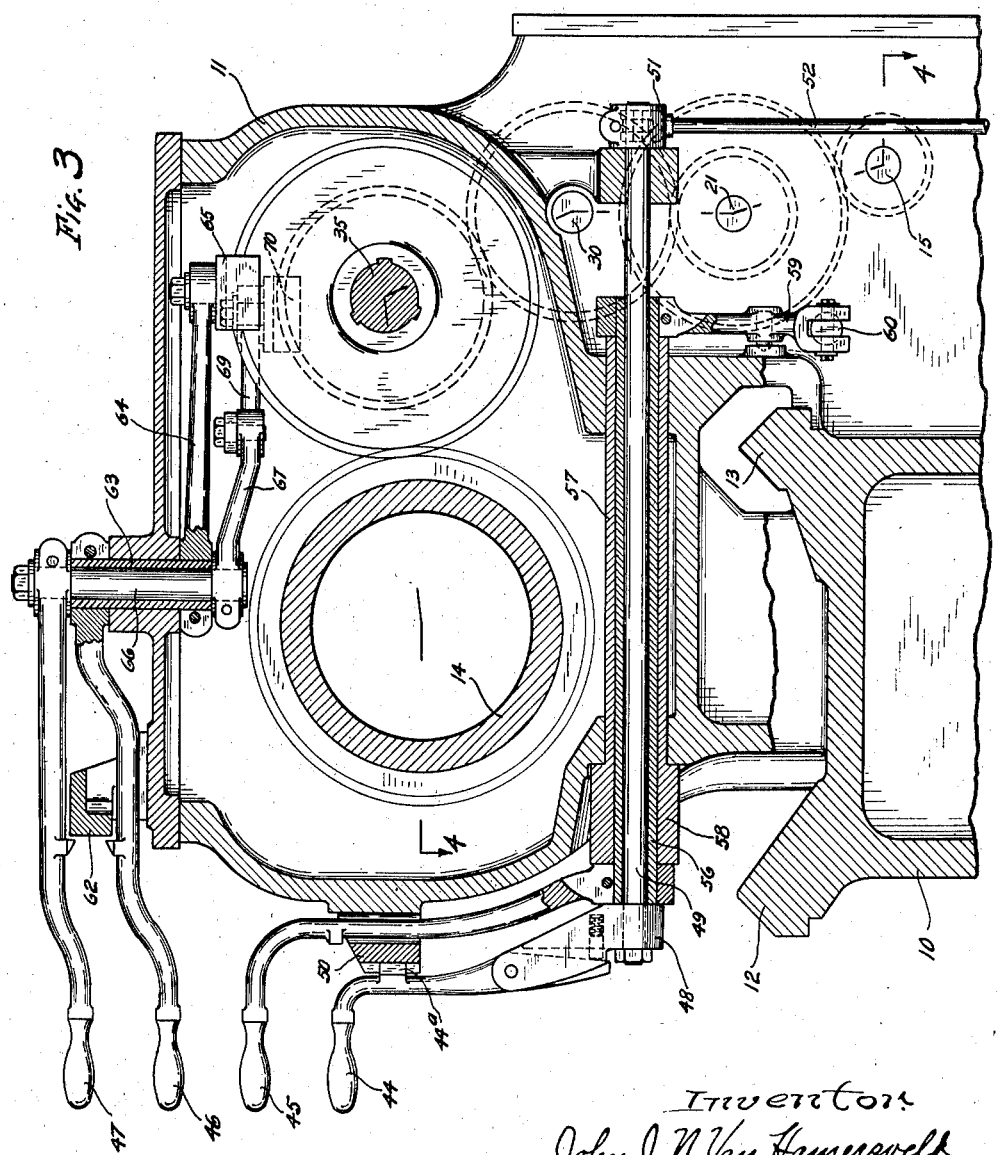

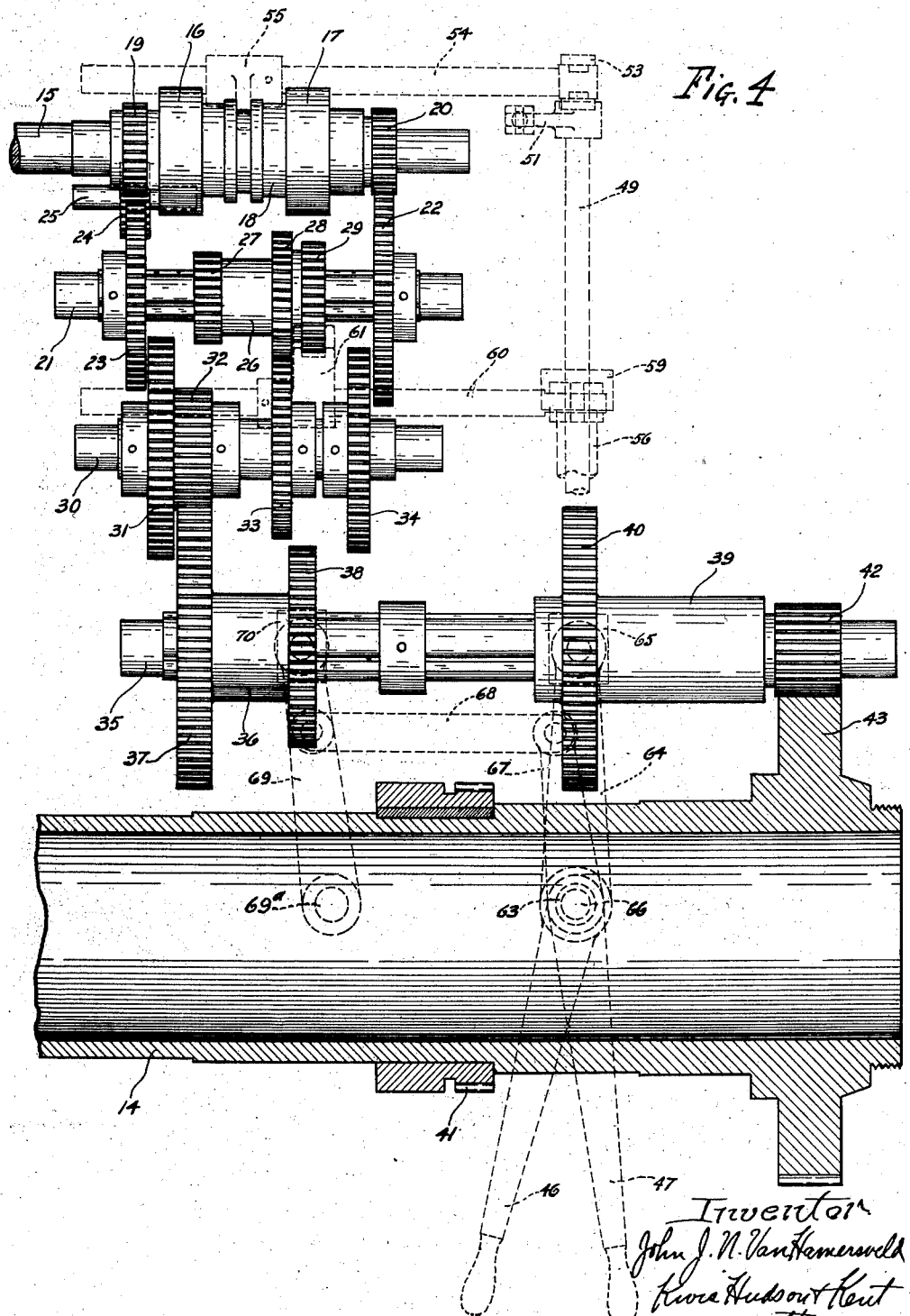

Patented Dec. 4, 1934

1,983,200

UNITED STATES PATENT OFFICE 1,983,200

CONTROL FOR MACHINE TOOLS

John J. N. Van Hamersveld, Cleveland Heights, Ohio, assignor to The Warner & Swasey Company, Cleveland, Ohio, a corporation of Ohio Application February 9, 1931, Serial No. 514,649

10 Claims. (Cl. 82—29)

This invention relates to a machine tool and particularly to the control means for the work or tool spindle in the head of the machine tool.

An object of the invention is to provide a control means for the spindle in the head of a machine tool wherein the control levers of such means are arranged in a group and can be readily reached by the operator of the machine without requiring him to move from his usual operating position, thus increasing the efficiency of the operation of the machine.

A further object is to provide a control means for the spindle in the head of a machine tool wherein the control levers for such means are disposed with their handles arranged substantially in alignment with each other and grouped together.

A still further object is to provide a control means for the spindle in the head of a machine tool wherein the control levers for said means are grouped at the front of the head of the machine and at the tool or work supporting end of the head near the operator's position.

Additional objects and advantages residing in the invention will become more apparent during the following description of a machine tool embodying the invention and shown in the accompanying drawings, wherein Figure 1 is a fragmentary front elevation of the head of a machine tool, certain of the parts being shown in section;

Fig. 2 is a rear elevational view of that portion of the head shown in Fig. 1;

Fig. 3 is a transverse vertical sectional view through the head and taken substantially on line 3—3 of Fig. 1, looking in the direction of the arrows; and Fig. 4 is a developed view taken substantially on line 4—4 of Fig. 3, certain parts of the control mechanism being shown in dotted lines.

The bed 10 of the machine tool supports the head 11 upon one end of the bed and is provided with front and rear ways 12 and 13 upon which move a turret saddle and turret and cross-slide carriages and cross-slides, as is well known in the art, and, therefore, these parts of the machine tool are not illustrated herein. The head 11 is provided with suitable bearings (not shown) for the work or tool spindle 14 which extends longitudinally through the head. The work or tool spindle 14 is connected with the main drive shaft in the head through suitable clutches and change speed gearing so that the starting and stopping of the spindle can be controlled and the direction and the rate of rotation of the spindle can be reversed or varied, as conditions of operation necessitate. The present invention resides particularly in the means for controlling the starting and stopping, and the direction and the rate of rotation of said spindle, and, therefore, this means will now be pointed out in detail.

Referring to Figs. 3 and 4, the main drive shaft is shown at 15, this shaft being driven at constant speed and being provided with clutch members 16 and 17 freely rotatable on the shaft and a shiftable clutch cone 18 arranged therebetween and splined to the shaft. The clutch member 16 has operatively associated therewith a gear 19 while the clutch member 17 is provided with a gear 20. Adjacent the main drive shaft 15 is a countershaft 21 rotatably supported in suitable bearings (not shown) and provided with a gear 22 keyed to the shaft 21 and constantly in mesh with the gear 20 of the clutch member 17. The shaft 21 is also provided with a gear 23 keyed thereto and constantly meshing with an idler gear 24 carried by an idler shaft 25 and meshing with the gear 19 of the clutch member 16 on the main drive shaft 15.

A three-step gear cone 26 having the gears 27, 28 and 29 is splined to the shaft 21 intermediate the gears 22 and 23. Another countershaft 30 is rotatably supported in the head upon suitable bearings (not shown) and is arranged adjacent to the shaft 21. The countershaft 30 is provided with gears 31, 32, 33 and 34, all of which are fixed to the shaft, with the gears 31, 33 and 34 arranged so that the gears 27, 28 and 29 of the gear cone 26 may be selectively intermeshed therewith.

A countershaft 35 is rotatably supported in the head in suitable bearings (not shown) and lies adjacent the work or tool spindle 14 and the countershaft 30.

A two step-gear cone 36 is splined to the shaft 35 and includes a gear 37, shown in Fig. 4, in mesh with the gear 32 on the shaft 30, and with a gear 38 adapted to be brought into mesh with the gear 34 on the shaft 30. The shaft 35 is further provided with a second two-step gear cone 39 splined to the shaft and having a gear 40 adapted to be intermeshed with a gear 41 fixed on the work or tool spindle 14. The gear cone 39 is further provided with a gear 42 arranged to be intermeshed with a gear 43 either integral with or fixed to the work or tool spindle 14. It will be seen from the foregoing description that when the clutch cone 18 is engaged with the clutch member 17, the work or tool spindle will be driven by the main drive shaft in one direction and at one speed of a series of different speeds, depending upon which gears of the gear cones previously mentioned are in driving relation with their respective intermeshing gears. As will be seen, one of the gear cones is a three-step gear cone and the other two are two-step gear cones and therefore the work or tool spindle 14 may be driven at twelve different speeds by shifting these gear cones to bring the various gears carried thereby into operative relation. It will further be seen that, when the clutch cone 18 is brought into engagement with the clutch member 16, the work or tool spindle 14 will be driven in the reverse direction and at a number of speeds corresponding to the driving speeds of the spindle in the first mentioned direction.

As viewed in Figs. 1 and 3, it will be seen that the control levers for controlling the starting and stopping, reversing and the rate of rotation of the work or tool spindle 14 have their handles located at the front side of the head and grouped together closely adjacent the tool or work supporting end of the head. It will further be seen that the levers have their supports arranged in the same vertical plane extending transversely through the head and adjacent the tool or work supporting end thereof, with the result that the handles of the levers will always be disposed in substantially vertical alignment, it being understood that the various operating positions of the levers will move the handles thereof to positions somewhat away from the vertical plane of the supports.

The control levers referred to are four in number and comprise the lever 44 which is the main control lever for shifting the clutch cone 18 to engage the clutch members 16 and 17 to control the starting and stopping and change of direction of rotation of the work or tool spindle, and the levers 45, 46 and 47 which control the shifting of the gear cones 26, 39 and 36 respectively.

The lever 44 is pivoted between two upstanding ears of a bracket 48 which in turn is fixed to a rock shaft 49, the bracket 48 carrying a spring pressed plunger which engages the end of the lever 44 to maintain the same normally in the position shown in Figs. 1 and 3, wherein an inwardly extending lug 44a on the lever will engage in a slot in an indicating bracket 50. The rock shaft 49 extends transversely through the head beneath the work or tool spindle 14 and projects outwardly of the rear side of the head. The rear end of the rock shaft 49 is supported in a bearing lug or boss formed on the head and has fixed thereto an arm 51 which is, in turn, pivotally connected to a downwardly extending connecting rod 52 (see Figs. 2 and 3). The lower end of the connecting rod 52 is pivoted to one arm of a bell crank lever 53 which is pivotally supported on a bearing boss formed on the head and has its other arm pivoted to a clutch shifting member 54, as shown in full lines in Fig. 2 and in dotted lines in Fig. 4. The clutch shifting member 54 extends into the head and has a sliding engagement therein, such member having fixed thereto a yoke 55 straddling the groove in the shiftable clutch cone 18. The neutral position of the lever 44 in which it is locked in the bracket 50 is shown in Figs. 1 and 3, at which time the clutch members 16 and 17 will both be disengaged from the driving shaft 15. When it is desired to start the rotation of the work or tool spindle, the lever 44 is first pulled out of its locked engagement with the bracket 50 and is then swung to rock the shaft 49 in the proper direction to move the clutch shifting member 54 to cause the clutch cone 18 to be engaged with the clutch member 17. When it is desired to reverse the direction of rotation of the work or tool spindle, the lever 44 is swung to the opposite side of the neutral position to that just described, which movement moves the shiftable clutch member 54 in a direction to disengage the clutch cone 18 from the clutch member 17 and engage the clutch cone with the clutch member 16.

The lever 45 which controls the shifting of the three-step gear cone 26 extends through the bracket 50 and is fixed to a sleeve 56 surrounding the rock shaft 49 and independently rotatable with respect thereto, and said bracket carries lettering indicating the different working positions of said lever. The head 11 is provided at its front and rear sides with aligned openings into which is pressed a bearing sleeve 57 having a shoulder 58 at its front end to tightly close said openings and prevent the escape of lubricant therethrough from the head chamber and to form a bearing for the sleeve 56 and rock shaft 49. The sleeve 56 at its rear end has fixed thereto an arm 59 which is pivotally connected at its lower end to a gear cone shifting member 60, there being a spring point carried by the arm 59 to retain the lever in its different positions, as is well understood. The gear cone shifting member 60 is slidably mounted in the head and has fixed thereto a yoke 61 which straddles the gear 29 (shown in dotted lines in Fig. 4) so that movement of the gear cone shifting member will shift the gear cone 26 into any of its three operative positions.

The lever 46 extends through an indicating bracket 62 arranged on the top of the head and adjacent the front edge thereof and bearing letters indicating the different working positions of the lever, said lever being fixed at its rear end to a sleeve 63 rotatably supported in a bearing boss on the cover plate of the head. The inner end of the sleeve 63 is fixedly connected to an arm 64 which swively supports a yoke 65 straddling the gear 40 of the two-step gear cone 39, see Figs. 3 and 4, so that movement of the lever 46 will shift the gear cone 39 to either of its two working positions.

The lever 47 extends above the indicating bracket 62 on which are arranged letters similar to those referred to above for the lever 46 and is fixed to a rock shaft 66 supported for independent rotation in the sleeve 63 and extending below the inner end of said sleeve. The inner end of the rock shaft 66 is fixed to a short arm 67 which in turn is pivotally connected to a link 68 extending toward the outer end of the head and pivotally connected at its end to an arm 69 which is pivoted on a bearing 69a supported in the head cover (see Fig. 1) and swively supports a yoke 70 which straddles the gear 38 of the gear cone 36, the arm 69 thus constituting a gear cone shifting member the movement of which will shift the gear cone 36 to either of its two working positions. Although not illustrated, it should be understood that the arms associated with the levers 45 and 47 may be provided with spring detents similar to that used on the arm 59 associated with the control lever 45.

The lever 44 having been shifted from its neutral position in a direction to cause the forward rotation of the work or tool spindle 14, the clutch cone 18 and clutch member 17 will be engaged and the main drive shaft 15 will be operatively connected to the countershaft 21 through the gears 20 and 22, and, as illustrated in Fig. 4, the work or tool spindle will be driven through the gear 28 of the three-step gear cone 26, the gear 33 fixed on the shaft 30, the gear 32 also fixed on the shaft 30, the gear 37 of the two-step gear cone 36 on the shaft 35, and the gear 42 of the two-step gear cone 39 which is in mesh with the gear 43 on the work or tool spindle. This drive of the work or tool spindle will be at one of the rates of rotation of the twelve different rates at which said spindle may be driven. When it is desired to drive the said spindle at other of the twelve different rates of rotation, it is merely necessary to shift one or more of the levers 45, 46 and 47 in the proper direction to shift the gear cones 26, 39 and 36 respectively.

It will be seen, by referring to Fig. 4, that movement of the lever 45 will shift the three-step gear cone 26 and disengage the gear 28 from the gear 33 and mesh gear 27 with the gear 31 on the shaft 30 or the gear 29 with the gear 34 on the shaft 30. The shifting of the lever 45, therefore, will result in obtaining three different rates of rotation of the spindle. The lever 46 controlling the gear cone 39 can be shifted to disengage the gear 42 from the gear 43 on the work or tool spindle and bring the gear 40 of the gear cone 39 into mesh with the gear 41 on said spindle, thus obtaining two additional different rates of rotation for the work or tool spindle over the three above referred to.

The shifting of the lever 47 controlling the two-step gear cone 36 on the shaft 35 will disengage the gear 37 of the gear cone from the gear 32 on the shaft 30 and engage the gear 38 of the gear cone with the gear 34 on the shaft 30, thereby enabling two more different rates of rotation to be imparted to the work or tool spindle over those previously referred to.

From the foregoing description it will be apparent that the work or tool spindle may be rotated at twelve different rates of rotation by manipulating the levers 45, 46 and 47, since the manipulation of the lever 45 results in obtaining three of these different rates, and the movement of the lever 46 provides for obtaining two additional different rates which, when combined with the three rates of rotation obtained by manipulation of the lever 45, will furnish six different rates of rotation for said spindle. The shifting of the lever 47 enables two more different rates of rotation to be given the work or tool spindle, and when such rates of rotation are combined with the six rates of rotation just above mentioned, a total of twelve different rates of rotation is obtained for said spindle. It will also be seen that the work or tool spindle may be rotated in the opposite direction and with the twelve different rates of rotation, as already explained. This reverse rotation of the work or tool spindle is obtained by shifting the lever 44 in the proper direction to disengage the clutch member 17 from the drive shaft 15 and engage the clutch member 16 with said shaft, whereupon the drive from the main drive shaft 15 will be through the gear 19, the idler gear 24 and the gear 23 fixed on the shaft 21. Although the gear drive for the work or tool spindle has been shown and described as providing twelve different rates of rotation for said spindle, it should be understood that a greater or lesser number of different rates of rotation could be provided by changing the steps of the shiftable gear cones to a greater or lesser number.

It will be remembered that the supports for the control levers are located in the same vertical plane extending transversely of the head and adjacent the tool or work supporting end of the head, and that the handles of the levers project outwardly of and are grouped together at the front of the head and in substantially the plane of the lever supports. This arrangement of the levers and their handles increases the efficiency of operation of the machine since there is no lost time or motion on the part of the operator in stepping from one part of the machine to another to reach the control levers. It is evident that with the lever handles grouped together at the front of the head and adjacent the tool or work end of the head, they are at all times within easy reach of the operator when he is standing in the usual operating station or position. The importance of the accessability of the operating levers to the operator will be appreciated when it is remembered that in a machine of this character it is necessary to frequently change the rate of rotation of the work or tool spindle at different stages of the operation and that if it is necessary for the operator to move from one position to another to shift the various levers for obtaining different rates of rotation of the work or tool spindle, considerable time is lost and the efficiency of operation of the machine lowered, due to the time consumed in moving from one position to another and to the fatigue of the operator as a result of such movement. On the other hand, with the levers arranged as described herein at the front of the head and closely adjacent the tool or work end of the head, the operator can shift the levers to start and stop and to obtain the requisite and different rates of rotation of the work or tool spindle without moving from his usual position and thus materially increase the efficiency of operation of the machine.

While I have shown the preferred embodiment of my invention, it is obvious that various changes may be made in the details of construction and the combination and arrangement of parts, and I therefore do not desire to be confined to the precise details and arrangements shown but aim in my claims to cover all changes and modifications which do not involve a departure from the spirit and scope of the invention.

Having thus described my invention, I claim:

1. In the head stock of a lathe, a spindle, and means for controlling the rotation of said spindle, comprising more than two control members certain of which have their supports on one side of said spindle and another of which has its support on the other side of said spindle with the supports of all the control members arranged in substantially a plane extending transversely of the head near the end thereof adjacent the machining operation.

2. In the head stock of a lathe, a spindle, and means for controlling the starting and stopping, the direction of rotation, and the rate of rotation of said spindle comprising, more than two control members certain of which have their supports on one side of said spindle and others of which have their supports on the opposite side of said spindle with the supports of all of said members arranged in substantially a plane extending transversely of the head near the end thereof adjacent the machining operation, said members having handle portions extending beyond the front face of the head and grouped in substantially the same plane.

3. In the head stock of a lathe, a spindle, and means for controlling the starting and stopping, the direction of rotation, and the rate of rotation of said spindle comprising more than two control members certain of which have their supports disposed horizontally and the remainder of which have their supports disposed vertically, the horizontally and vertically disposed supports being arranged on opposite sides of said spindle with all of said supports arranged in substantially a plane extending transversely of the head near the end thereof adjacent the machining operation.

4. In the head stock of a lathe, a chamber and a spindle extending therethrough, and means for controlling the starting and stopping, the direction of rotation, and the rate of rotation of said spindle located partly within the chamber and partly without the chamber, comprising more than two control members certain of which project into the said chamber and the remainder of which pass through said chamber, the supports for all of the control members being arranged in substantially a plane extending transversely of the head near the end thereof adjacent the machining operation.

5. In the head stock of a lathe, a chamber and a spindle extending therethrough, and means for controlling the starting and stopping, the direction of rotation, and the rate of rotation of said spindle located partly within the chamber and partly without the chamber, comprising more than two control members certain of which project into said chamber on one side of said spindle and the remainder of which pass through said chamber on the other side of said spindle, the supports of all of said control members being arranged in substantially a plane extending transversely of the head near the end thereof adjacent the machining operation.

6. In the head stock of a lathe, a chamber and a spindle extending therethrough, and means for controlling the starting and stopping, the direction of rotation, and the rate of rotation of said spindle located partly within the chamber and partly without the chamber, comprising more than two control members certain of which project into said chamber on one side of said spindle and the remainder of which pass through said chamber on the other side of said spindle, the supports of all of said control members being arranged in substantially a plane extending transversely of the head near the end thereof adjacent the machining operation, said control members having handle portions extending beyond the front face of the head and grouped in substantially the same plane.

7. In the head stock of a lathe, a spindle, and means for controlling the starting and stopping, the direction of rotation, and the speed of rotation of said spindle, comprising coaxial levers arranged at the top of the head and coaxial levers arranged on the front of the head, the axes of all of said levers lying in substantially a plane extending transversely of the head near the end thereof adjacent the working operation.

8. In the head stock of a lathe, a spindle, and means for controlling the starting and stopping, the direction of rotation, and the speed of rotation of said spindle, comprising coaxial levers arranged at the top of the head and coaxial levers arranged on the front of the head, the axes of said levers being angularly disposed with respect to each other and lying in substantially a plane extending transversely of the head near the end thereof adjacent the machining operation, said levers having handle portions projecting beyond the front face of the head and grouped together in substantially said plane.

9. In the head stock of a lathe, a chamber with a spindle extending therethrough, and means for controlling the starting and stopping, the direction of rotation, and the speed of rotation of said spindle located partly within the chamber and partly without the chamber, comprising more than two control members certain of which have their supports extending into said chamber and the remainder of which have their supports extending through said chamber, and shifting arms connected to said control members, the shifting arms of the first group of control members being located solely within said chamber and the shifting arms of the second group being outside of said chamber.

10. In a machine tool, a bed, a head stock having a portion above the bed and another portion at the side of the bed, a spindle extending through that portion of the head stock above the bed, means for controlling the starting and stopping, the direction of rotation and the speed of rotation of said spindle located partly in the portion of the head stock above the bed and partly in the portion at the side of the bed, and including more than two control members certain of which control the means in the portion of the head stock above the bed and others of which control the means in the portion of the head stock at the side of the bed, said control members having their supports arranged in substantially a plane extending transversely of the head adjacent the working operation with their handle portions located at the front of the head and in said plane.

JOHN J. N. VAN HAMERSVELD.